Patented Dec. 12, 1950

2,533,316

UNITED STATES PATENT OFFICE 2,533,316

HANDLING OF URANIUM HEXAFLUORIDE IN VESSELS OF GLASS AND SILICA

Aristid V. Grosse, New York, N. Y.

No Drawing. Application February 1, 1941,
Serial No. 377,051

9 Claims. (Cl. 23—14.5)

This invention relates to the reduction in corrosion of glass and silica vessels containing uranium hexafluoride.

In one specific embodiment the present invention comprises a process for decreasing corrosion of glass and silica equipment in contact with uranium hexafluoride which comprises commingling said uranium hexafluoride with a dry alkali metal fluoride.

It is difficult generally to handle and keep uranium hexafluoride in glass and/or silica vessels or in contact with porous diaphragms made of silica or substantially silica because the presence in said uranium hexafluoride of small amounts of water and/or hydrogen fluoride starts a catalytic decomposition cycle with the silica content of the glass and gradually converts a substantial proportion of the uranium hexauoride into one or several less volatile uranium oxyfluorides, while the silica is converted into gaseous silicon tetrafluoride. This harmful action of water and/or hydrogen fluoride is probably due to the fact that these impurities are regenerated continuously by a series of reactions which may be illustrated by the following equations:

(1) $2UF_6 + 2H_2O \rightarrow 2UOF_4 + 4HF$
(2) $4HF + SiO_2 \rightarrow 2H_2O + SiF_4$ Water regenerated as illustrated in Equation 2 may then react with a further quantity of uranium hexafluoride according to Equation 1.

It is well known that alkali fluorides as sodium fluoride and potassium fluoride combine with both hydrogen fluoride and silicon tetrafluoride forming, respectively, the non-volatile and stable alkali metal difluorides as $NaF \cdot HF$ and the alkali metal fluosilicates as $Na_2SiF_6$. Accordingly it should be possible to use alkali metal fluorides as inhibitors for the decomposition of uranium hexafluoride by small amounts of water and/or of hydrogen fluoride. However, O. Ruff, the discoverer of uranium hexafluoride, claimed that it combines with alkali metal fluorides at room temperature. Further, O. Ruff and F. Heinzelmann, "Zeitschrift für anorganisches Chemie" (1911), vol. 72, pages 65–7, indicated that uranium hexafluoride forms yellow compounds with potassium fluoride and that uranium hexafluoride forms a very stable double compound with sodium fluoride. These statements, if true, would preclude the use of alkali metal fluorides as inhibitors for the decomposition of uranium hexafluoride.

As the result of many experiments I have found, contrary to the statements of Ruff and Heinzelmann, that neither potassium fluoride nor sodium fluoride combines with uranium hexafluoride at room temperature and that these alkali metal fluorides are excellent inhibitors for preventing decomposition of uranium hexafluoride. By placing from about 1% to about 10% by weight of a powdered dry alkali metal fluoride in contact with uranium hexafluoride, it is possible to keep uranium hexafluoride in contact with glass and/or silica for periods of many months with substantially no decomposition of uranium hexafluoride and with substantially no corrosion of the glass, silica, or other material containing silica in chemical combination.

I have further found that only in the presence of hydrogen fluoride does uranium hexafluoride combine with an alkali fluoride, as potassium fluoride, to form stable complex compounds which are frequently yellow in color. However, after such hydrogen fluoride impurity has combined with uranium hexafluoride and potassium fluoride, there is no further consumption of uranium hexafluoride.

The following example is introduced as characteristic of the operation of the present process, although it is presented with no intention of limiting the scope of the invention:

The beneficial action of the addition of potassium fluoride to uranium hexafluoride was illustrated by comparative tests made upon two dry glass tubes, one containing uranium hexafluoride and the other a mixture of about 95% by weight of uranium hexafluoride and 5% by weight of potassium fluoride. After standing at room temperature for a short time, the tube containing uranium hexafluoride soon became opaque, scale-like material developed on the walls of the tube, and non-volatile uranium oxyfluorides were generated therein. In contrast with this, the glass tube containing the uranium hexafluoride-potassium fluoride mixture remained clear and the uranium hexafluoride did not decompose during a period of several months.

The nature of the present invention and results obtainable in practice are evident from the preceding specification and example given, although neither section is intended to unduly limit the broad scope of the invention

I claim as my invention:

1. A process for substantially preventing decomposition of uranium hexafluoride in contact with a material containing chemically combined silicon which comprises adding to said uranium hexafluoride an alkali metal fluoride.

2. A process for substantially preventing decomposition of uranium hexafluoride in contact with glass which comprises adding to said uranium hexafluoride an alkali metal fluoride.

3. A process for substantially preventing decomposition of uranium hexafluoride in contact with silica which comprises adding to said uranium hexafluoride an alkali metal fluoride.

4. A process for substantially preventing decomposition of uranium hexafluoride in contact with a material containing chemically combined silicon which comprises adding to said uranium hexafluoride between about 1 and about 10% by weight of an alkali metal fluoride.

5. A process for substantially preventing corrosion of glass in contact with uranium hexafluoride which comprises adding to said uranium hexafluoride between about 1 and about 10% by weight of an alkali metal fluoride.

6. A process for substantially preventing corrosion of a silica-containing material in contact with uranium hexafluoride which comprises adding to said uranium hexafluoride between about 1 and about 10% by weight of an alkali metal fluoride.

7. A process for substantially preventing corrosion of a silica-containing material in contact with uranium hexafluoride which comprises adding to said uranium hexafluoride between about 1 and about 10% by weight of sodium fluoride.

8. A process for substantially preventing corrosion of a silica-containing material in contact with uranium hexafluoride which comprises adding to said uranium hexafluoride between about 1 and about 10% by weight of potassium fluoride.

9. A process for substantially preventing corrosion of silica in contact with uranium hexafluoride which comprises adding to said uranium hexafluoride between about 1 and about 10% by weight of an alkali metal fluoride.

ARISTID V. GROSSE.

REFERENCES CITED

The following references are of record in the file of this patent:

Ruff and Heinzelmann: "Zeitschrift für Anorganisches Chemie," vol. 72, pages 65–67. Copy in Scientific Library.